E. D. BETTS.
UNIVERSAL JOINT.
APPLICATION FILED JUNE 28, 1915.
1,188,883. Patented June 27, 1916.
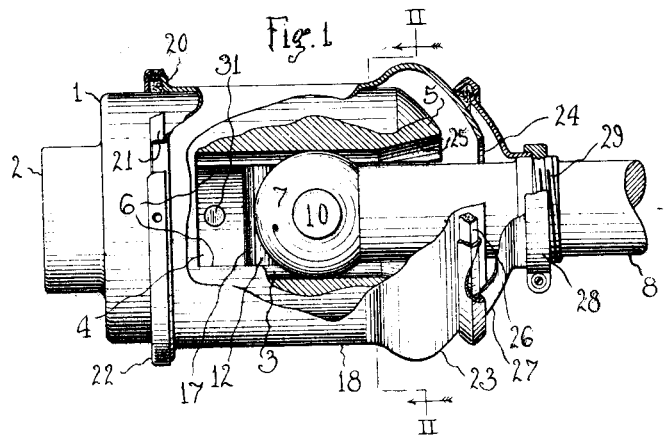
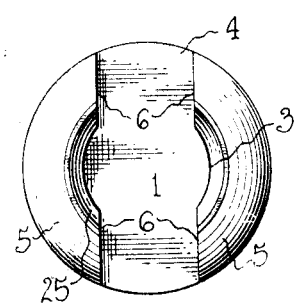
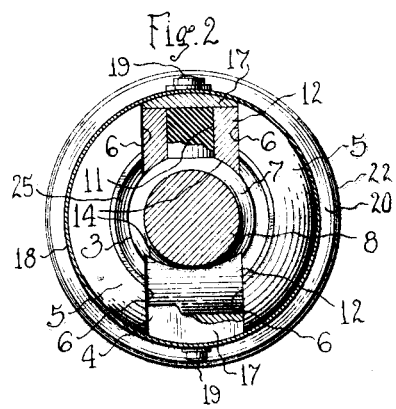
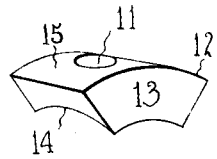
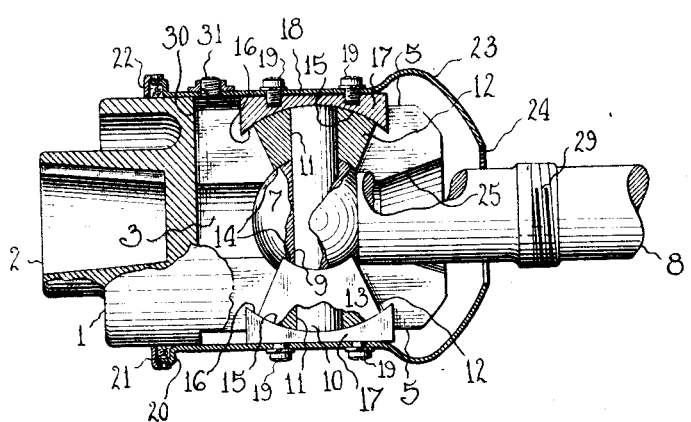
Inventor
Everett D. Betts
Witnesses
Karl H. Butler
By
Attorneys

UNITED STATES PATENT OFFICE.

EVERETT D. BETTS, OF DETROIT, MICHIGAN, ASSIGNOR OF TWO-FIFTHS TO WALTER I. OESCHGER, OF DETROIT, MICHIGAN.

UNIVERSAL JOINT.

1,188,883.    Specification of Letters Patent.    Patented June 27, 1916.

Application filed June 28, 1915. Serial No. 36,679.

*To all whom it may concern:*

Be it known that I, EVERETT D. BETTS, a subject of the King of England, residing at Detroit, in the county of Wayne and State of Michigan, have invented certain new and useful Improvements in Universal Joints, of which the following is a specification, reference being had therein to the accompanying drawings.

This invention relates to universal joints, and the primary object of my invention is to provide a universal joint wherein driving and driven members are articulated to revolve with one member disposed at an angle to the other and withstand severe lateral stresses, without a material increase in the dimensions of the joint.

Another object of my invention is to provide a dust proof sliding universal joint having provision for a supply of oil in much greater quantities than can be furnished by forms of oilers now in use for such joints.

Another object of my invention is to provide a strong, simple and durable universal joint which shall present a large bearing surface in proportion to its diameter and which also presents a neat and finished appearance, free from projecting arms or parts, which are liable to catch the clothing of operators, resulting in accidents, particularly when the joint is used in connection with exposed shafts of driven members.

With the above and other objects in view, my invention resides in the novel construction, combination and arrangement of parts to be hereinafter described and then claimed, and reference will now be had to the drawings, in which—

Figure 1 is a side elevation of the universal joint, partly broken away and partly in section; Fig. 2 is a cross sectional view taken on or about the line II—II of Fig. 1; Fig. 3 is a longitudinal sectional view of the universal joint, partly in elevation; Fig. 4 is a view of the inner end of a detached driving member and Fig. 5 is a perspective view of a detached shoe.

In the drawing, 1 denotes a cylindrical driving member and the outer end of said member is formed with a socket 2 adapted to receive a driving shaft. The inner end of the member 1 has a longitudinal bore 3 and a longitudinal slot 4, said slot intersecting the bore 3 and providing jaws 5 with flat confronting faces 6. The slot 4 is of a width less than the diameter of the bore 3, consequently the bore provides diametrically opposed concaved seats for a spherical body or ball 7, carried by the inner end of a driven member 8. The spherical body 7 has a transverse opening 9 for a pin 10 loosely mounted in said opening. The ends of the pin 10 extend into openings 11 provided therefor in shoes 12 arranged in the slot 4 upon the spherical body 7. The shoes 12 have their flat faces 13 engaging the confronting faces 6 of the driving member; concave faces 14 conforming to the periphery of the spherical body 7, and convex faces 15 engaging concave seats 16 of slide blocks 17. The slide blocks 17 are movable in the slot 4 against the flat faces 6 of the driving member and said slide blocks are connected to diametrically opposed inner walls of a cylindrical casing 18 by set screws 19 or similar fastening means. The casing 18 is slidable upon the driving member 1 and said casing has the inner end thereof reamed or offset, as at 20, to provide an annular container for a packing 21. The packing 21 is held in engagement with the driving member 1 by a cap 22 screwed or otherwise mounted upon the reamed end of the casing. The opposite end of the casing 18 is provided with a globular head 23 having a concentric opening 24 providing clearance for the driven member 8. The outer end of the bore 3 is also enlarged or flared as at 25, whereby the driven member 8 can assume a position at an angle to the longitudinal axis of the driving member 1.

Engaging the outer side of the globular head 23 is an annular packing ring 26 carried by a cap 27 mounted upon the driven member 8 and retained thereon by a clamping ring 28 engaging a threaded portion 29 of the driven member. The packing rings 21 and 26 coöperate with the casing 18 and the caps 22 and 27 in providing a dustproof inclosure for the movable elements of the universal joint, besides constituting a reservoir for a lubricant which can be placed in the casing 18 through a filling opening 30 normally closed by a plug 31. By excluding dust and thoroughly lubricating the contact surfaces of the driving member 1, the spherical body 7, the shoes 12 and the sliding blocks 17, there is a minimum friction and an easy adjustment of the driven member 8 relatively to the driving member 1.

It is thought that the operation and utility of my invention will be apparent without further description and while in the drawing there is illustrated a preferred embodiment of the invention, it is to be understood that the structural elements are susceptible to such changes, in size, shape and manner of assemblage, as fall within the scope of the appended claims.

What I claim is:—

1. A universal joint comprising a driving member having a longitudinal slot, a driven member having a spherical body within the slot of said driving member, shoes on the spherical body of said driven member, and a casing slidable on said driving member, and maintaining said shoes on the spherical body of said driven member.

2. In a universal joint, a driving member, provided with a longitudinal slot, a driven member extending into the slot of said driving member, shoes on said driven member within the slot of said driving member, blocks on said shoes, a casing on said driving member supporting said blocks, and a cap carried by said driven member and engaging said casing.

3. A universal joint comprising a driving member, a driven member extending therein, shoes on said driven member within said driving member, blocks on said shoes within said driving member, a casing having a sliding connection with said driving member and supporting said blocks, and a cap carried by said driven member and engaging said casing and coöperating therewith in providing an inclosure for said shoes and said blocks.

4. A universal joint comprising a driving member, provided with a longitudinal slot, a driven member having a spherical body within the slot of said driving member, a transverse pin carried by the spherical body of said driven member, shoes on the ends of said pin engaging the spherical body of said driven member, blocks slidable on said shoes within the slot of said driving member, a casing on said driving member supporting said blocks, a packing between said casing and said driving member, a cap on said driven member, and a packing between said casing and said cap.

5. A universal joint comprising a reciprocable and revoluble sectional casing with one section adapted for universal movement relative to the other section, and members articulated in said casing with one of said members adapted to reciprocate and revolve said casing.

6. A universal joint comprising a driving member, a driven member slidable therein, a casing carried by said driven member and slidable on said driving member, and means projecting inwardly from said casing adapted to cause rotative continuity between said driving and driven members.

In testimony whereof I affix my signature in presence of two witnesses.

EVERETT D. BETTS.

Witnesses:
 LEWIS E. FLANDERS,
 G. E. McGRANE.